United States Patent [19]

McIntosh et al.

[11] 3,734,630

[45] May 22, 1973

[54] COPY DENSITY READING AND EXPOSURE CONTROL SYSTEM

[75] Inventors: Walter L. McIntosh, Woodbridge; Dale M. Schmidt, Annandale, both of Va.

[73] Assignee: Log Etronics Inc., Springfield, Va.

[22] Filed: Sept. 9, 1971

[21] Appl. No.: 179,080

[52] U.S. Cl. ..................356/203, 356/204, 356/205, 356/212, 356/218, 250/219 QA, 250/219 DQ

[51] Int. Cl. ..................G01b 9/02

[58] Field of Search..................356/67, 68, 203, 356/204, 205, 195, 209, 212, 71, 213; 250/219 QA, 219 DQ, 219 R

[56] References Cited

UNITED STATES PATENTS

| | | | |
|---|---|---|---|
| 3,542,470 | 11/1970 | Ost | 355/68 |
| 3,397,611 | 8/1968 | Davies | 355/68 |
| 3,512,894 | 5/1970 | Wood | 356/195 |
| 3,623,817 | 11/1971 | Celio | 356/205 X |

*Primary Examiner*—Ronald L. Wibert
*Assistant Examiner*—Paul K. Godwin
*Attorney*—William D. Hall et al.

[57] ABSTRACT

An automatic exposure control system for a Graphic Arts camera comprises a copy reading unit and a separate camera control unit. The copy reading unit includes a densitometer head adapted to be moved to various different selected portions of copy to produce signals representative of the reflectivity or light transmission of those selected portions; and these signals are converted into potentials representative of density. The levels of the density-representing signals are compared with a pre-set threshold potential to automatically segregate signals representative of minimum copy density ($D_{min}$) from those representative of maximum copy density ($D_{max}$) ; and the two different types of signals are then automatically routed to two different peak-reading channels in the copy reading unit operative to retain the lowest $D_{min}$ encountered, and also operative to compute and retain, from $D_{min}$, $D_{max}$, and screen range, the highest excess density ($D_X$) encountered. The $D_{min}$ and $D_X$ parameters can be represented by potentials on potentiometers forming portions of null-seeking servomechanisms, and can also be recorded on a control card. The control card can be transferred, along with an associated piece of copy, to a camera control unit responsive to the recorded information and operative to reestablish the potentials $D_X$ and $D_{min}$; and these reestablished potentials are then used to compute and control the main, bump (or no-screen), and flash exposures.

13 Claims, 5 Drawing Figures

United States Patent [19]
McIntosh et al.
[11] 3,734,630
[45] May 22, 1973
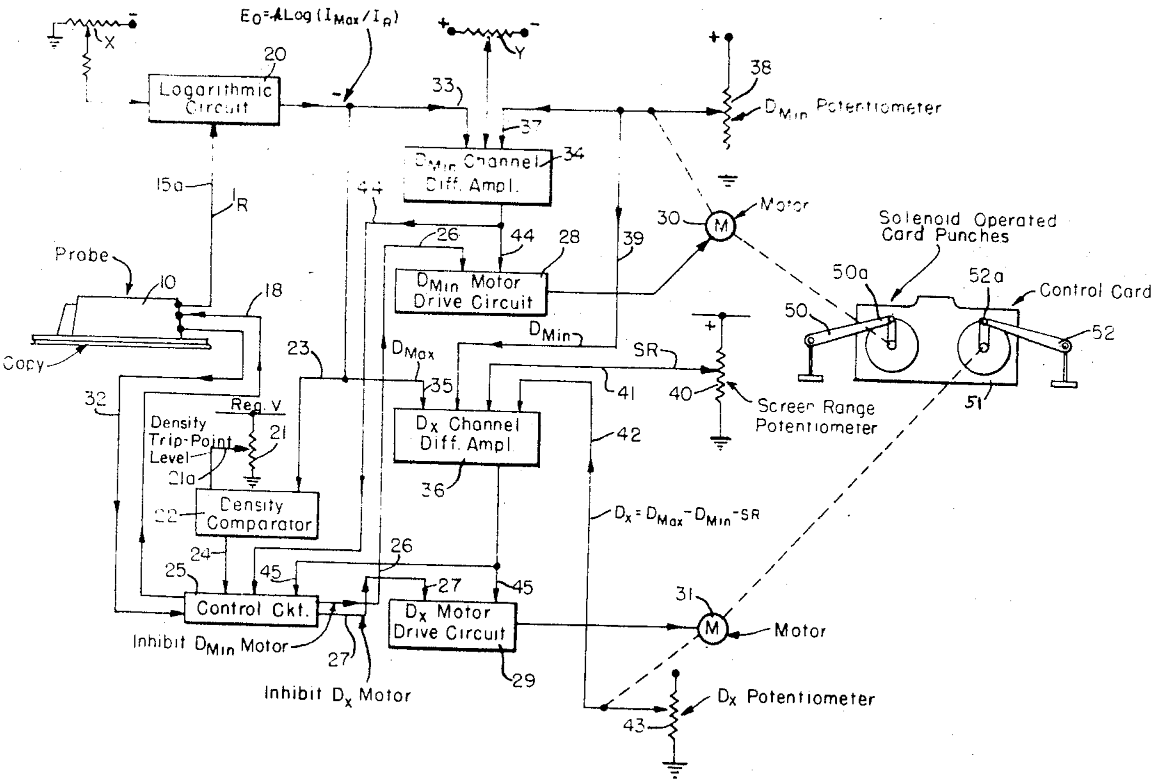

INVENTORS
Walter L. McIntosh
Dale M. Schmidt
BY [signature]
ATTORNEY

INVENTORS
Walter L. McIntosh
Dale M. Schmidt
BY
ATTORNEY

INVENTORS

Walter L. McIntosh
Dale M. Schmidt

BY

ATTORNEY

COPY DENSITY READING AND EXPOSURE CONTROL SYSTEM

BACKGROUND OF THE INVENTION

The present invention is concerned with Graphic Arts techniques employing halftone processes, and is more particularly concerned with systems of generally known types wherein one, two, or three different types of exposure of a Graphic Arts camera may be employed to obtain a controlled image of copy having desired characteristics. In this respect, therefore, it will be understood that the structures to be described hereinafter are intended for use in conjunction with preexisting systems employing a graphic arts camera or enlarger associated with standard copy supports, easels for photosensitive material, halftone screens adapted to be moved into and out of the imaging path as may be necessary, and appropriate light sources mounted in proper position adjacent the camera and adapted to be turned on and off in any selected sequence during the imaging process.

The types of exposure which are customarily employed in halftone processes include (a) a main (or halftone) imaging exposure through a halftone screen which may be disposed closely adjacent the photosensitive material or in actual contact therewith; (b) a no-screen (or "bump") exposure which provides additional exposure of highlight portions of the copy and which increases the contrast in such highlight portions; and (c) a flash exposure through the halftone screen with nonimage-bearing light, which functions to insert minimum size shadow dots in the reproduction. How many of these three different types of exposure may be necessary in any particular reproduction process is dependent upon the copy being reproduced; and in some cases fewer than these three types of exposure may be necessary. In other cases, however, all three types of exposure may be needed to produce a satisfactory image of the copy. The precise order in which the exposures are effected is not critical, but a preferred procedure is normally selected by the operator, for convenience.

The main or halftone imaging exposure is, of course, a controlled exposure; and the value of exposure, in the most common technique, is determined by the brightest part of the copy. In other techniques, however, the main exposure may be governed by the brightness of a mid-range tone, with highlights then being added by bump exposure, and shadows being added by flash exposure. The equations utilized in the art for determining the main exposure, bump exposure, and flash exposure are, in themselves, well known; and the most common equations are set forth, for example, in "Tone Reproduction in Halftone Negatives" by J. A. C. Yule, Proc., 2nd Annual Meeting TALI, pp 68–81, 1951; and "Programmed Monochrome Reproduction" by C. Nash, Penrose Annual, 1968, p.170. These known equations are utilized in the present invention.

In order to make proper exposures, an operator (or equipment employed to control the exposures) must normally determine and/or be provided with at least two basic kinds of information. The first necessary piece of information is sometimes termed ($D_{min}$), and involves information regarding the lowest density (or highest reflectance portion) of the copy. The second type of information which is ordinarily needed is termed ($D_{max}$) and relates to the shadow density (or lowest reflectance portion) of the copy. While reference has been made to "reflectance", it will be understood that the parameters referred to are not limited to such reflectance and could equally as well be related to the transparency of copy which is to be reproduced. If the so-called "copy range" (i.e., $D_{max} - D_{min}$) is greater than the so-called "screen range" (sometimes designated SR or BDR) of the halftone screen employed, some provision must be made to extend the effective screen range. The difference between the copy range and screen range is commonly termed "excess density" (or $D_X$); and this difference determines the necessary duration and intensity of the flash exposure (in accordance, for example, with the equation appearing in reference texts previously cited herein). In order to provide properly controlled exposures of the aforementioned three different types, therefore, some determination must be made of $D_{min}$, $D_{max}$, SR, and, on the basis of these factors, of $D_X$.

A variety of systems have been suggested heretofore for obtaining information regarding the parameters discussed above. In many cases, a densitometer or the like is employed by an operator to read those portions of copy which the operator selects as having the highest and lowest reflectance. In some cases, the densitometer is associated with a meter which provides a visual indication of the density at selected portions of the copy; and these visual indications must be remembered or written down by the operator as he proceeds to analyze the copy so that he has a record of the necessary parameters. Techniques of this type are subject to major errors since, in determining $D_{min}$ for example, the operator may test a number of different points on the copy but, due to faulty recollection or recording, may fail to recall (or may incorrectly note) the parameter value of the point which actually exhibits the lowest density. Similar errors are possible as the operator checks a plurality of points any of which might possibly represent $D_{max}$. Moreover, and of equal importance, since selection of the proper points and the proper recording of parameter information depends entirely upon the care taken by an operator, these techniques are necessarily tedious and time consuming in addition to being error-prone.

Once the data is determined by a meter-reading or dial-reading technique of the general type discussed above, it can be applied to any of a variety of graphic arts exposure control systems suggested heretofore. One such system is described in Ost U.S. Pat. No. 3,542,470, which employs bridge circuits to effect the density measurement. Other systems are commercially available under the trade names "Carlson Gammamatic" or "Carlson Gammatrol" marketed by Chesley F. Carlson Company of Minneapolis, Minn.; the "Expotron" manufactured by Lettergieterij, of Amsterdam, Holland; the "Densichron" exposure computer model No. 3849J, marketed by Sargent-Welch Scientific Co. of Skokie, Ill.; the "Graphics Computer" manufactured by Wicker Research Inc. of Rochester, N.Y.; the "Imagic" manufactured by Robertson Photomechanix Inc. of Des Plaines, Ill.; the Graph Master Model DSG-101 manufactured by Dainippon Screen Manufacturing Co. Ltd. of Tokyo, Japan; the "Gevarex" system manufactured by Agfa-Gevaert of Antwerp, Belgium; the "Progamma" manufactured by Graphic Research & Development Ltd., of Harpenden, Herts, England; and others.

Still other approaches to photographic exposure control, which do not expressly rely upon derivation of the parameters discussed earlier, but do employ somewhat analogous techniques, are described in U.S. Pat. Nos. to Denner 3,484,165, Davies, 3,397,611, Atkinson 3,335,636, Lundin 3,393,604, Pack 3,249,000, Simmon 3,227,039, Childers 3,217,206, Pickens 3,120,161, Olson 3,074,312, Maisch 2,450,288, Kott 2,386,320, Burnham 2,353,218, Fuller 2,000,589, and Denis 1,973,468.

Notwithstanding the very considerable activity in this field heretofore, as manifest by the prior suggestions and approaches identified above, such prior systems have been rather slow in operation, limited in flexibility, complex and costly to install and maintain, and subject to major possible error due, to some extent, to the need for an operator to deal with a mass of data much of which may actually be irrelevant. The present invention, recognizing these difficulties in prior art approaches, is concerned with a highly improved system which is faster, simpler, more accurate, and far more flexible than systems suggested heretofore.

SUMMARY OF THE INVENTION

The present invention is concerned with an improved system which comprises two basic units constituting a Graphic Arts copy reader and a camera control unit. Each of these units is, in itself, improved over corresponding portions of systems suggested heretofore. The two units of the system may be directly interconnected or, in the alternative, may cooperate with one another through the medium of a control card or other physical record prepared at the copy reader and recording parameters thereon, and capable of being read at the camera control unit for initiating an appropriate control sequence.

The copy reader portion of the present invention employs an improved densitometer having a probe or sampling head which can be moved to any of a plurality of selected areas on a piece of copy for measuring the copy reflection or transmission density at those selected areas. The head is adapted to assume either of two positions, namely a "standby" position and an "operate" position; and in the standby position provision is made (particularly through the employment of an internal, protected, calibration plaque) for minimizing the effects of hysteresis which have characterized photoconductive-type densitometers in the past. The densitometer head itself, therefore, tends to produce output signals which more accurately represent the density at a selected portion of the copy than has been possible in such densitometers suggested heretofore. These improvements are enhanced, moreover, by causing the lamp in the densitometer head to selectively assume either of two light levels in dependence upon whether the head is in its "standby" position, or whether it is in a "calibrate" or "operate" condition.

In the preferred embodiment to be discussed hereinafter, the densitometer head is adapted to measure the light reflectance or light transmission of the copy. Output signals generated by the densitometer head are coupled to a logarithmic circuit which operates to modify the probe output signals to produce input signals, for processing, which are related logarithmically to the light reflectance or transmission of the copy. This portion of the system eliminates the need (characteristic of various prior systems) to somehow shape the output transfer characteristic of the densitometer, or the use of very specially calibrated dials, meters, or other indicating devices; and provides equal increments of density over the entire measuring range thereby avoiding possible errors due to crowding of the indications at one end of the measuring range when an attempt is made to operate with a linearly responsive measuring device.

The logarithmic signals, which represent the input signals to be processed, are fed to circuits in the copy reader which automatically segregate between those signals which may be representative of $D_{min}$, and those signals which may be representative of $D_{max}$. Two separate channels are provided for measuring these two different types of signals; and a "threshold" or trip-point voltage provided in the system automatically routes the different signals to their proper channels. Each channel, moreover, is of the peak-reading type (in opposite senses) and includes a servomechanism which responds only to the highest (or lowest, as the case may be) value of signal, in a succession of signals, fed to the channel in question. Therefore, after a measuring sequence has been completed, only the highest and the lowest parameter values are retained, this being done automatically and without requiring any attention by the operator. One of the channels, moreover, includes a computation apparatus responsive to a $D_{min}$ value stored in the other channel, and also responsive to SR and $D_{max}$ parameters, for automatically computing, as the copy reading proceeds, successive values of $D_X$ with only the extreme such computed value being retained, in the manner already described. By this arrangement, the lowest $D_{min}$, and the highest $D_X$ are automatically determined and stored as parameters in the copy reader.

The copy reader includes, in the preferred embodiment of the invention, a card punch mechanism or other data recorder adapted to record the aforementioned $D_{min}$ and $D_X$ values as discrete holes in a control card (or as some other appropriate record manifestation on a suitable record medium). When the copy reader is separate from the camera control unit, the copy reading operation can be carried out independently of the actual camera control operations; and an operator, working with the copy reader of the present invention, can measure a large number of pieces of copy in sequence, producing (by the techniques described) an appropriate control card for each such piece of copy. Each such control card can then be attached to its associated reproduction copy material for reference purposes, and also for transfer and utilization, at any desired time, at a camera control unit, or at any of a variety of similar such camera control units, located remotely from the copy reader, or for use in any other control application capable of using copy parameters such as $D_{min}$, $D_{max}$, copy range, $D_X$ or the like, or combinations thereof.

It will be appreciated from the foregoing that the copy reader is not limited, in its usage, to a Graphic Arts camera control application; and the copy reader of the present invention, per se, can be employed for other purposes. For example, if the copy reader is set up to measure $D_{min}$ and copy range (i.e., $D_{max} - D_{min}$) rather than $D_X$, the copy reader can, in such case, be employed to furnish information permitting the establishment of appropriate contrast conditions in subsequent reproduction processes.

When the copy reader is employed in conjunction with a camera control unit, for exposure control, a physical record prepared by the described technique can be inserted into a mechanism acting as an input device to the camera control unit. The reading mechanism responds to the positions of the holes or other record manifestations in or on the record medium and, through an automatic mechanism, reproduces the parameter values at the camera control location. These parameters are fed through appropriate circuits operative to compute and control the main, bump, and flash exposures. Provision is made for permitting selection of any desired percentage of bump; and the circuits are so arranged that the total exposure is automatically maintained constant for any selected highlight. In addition, provision is made for permitting correction of density parameters insofar as they may be affected by factors such as flare and/or copy fluorescence.

DESCRIPTION OF THE PREFERRED EMBODIMENTS

As described previously, the present invention employs a densitometer which includes a head or probe structure adapted to be moved to various positions relative to copy (e.g. photographs, artwork, etc.), and adapted to be actuated to provide an input signal to a copy reading unit. The copy reading unit, in turn, is designed to automatically generate two parameters corresponding respectively to $D_{min}$ and $D_X$, which parameters are then retained and, if desired, recorded on discrete areas of a control card in the form of punched holes or other record manifestations. Such a control card, with the parameter information stored thereon, can be transferred with the copy to a separate location where a unit comprising a card reader, exposure computer, light integrators and camera controls, is associated with a Graphic Arts camera which is to have its exposure functions controlled in a programmed fashion.

Figure 1A:
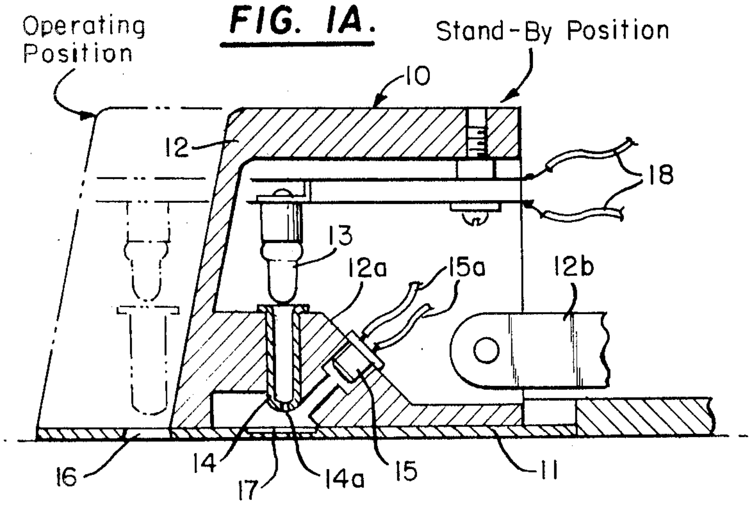
FIGS. 1A and 1B are cross-sectional side and end views respectively of a densitometer head or probe constructed in accordance with the present invention.
Figure 1B:
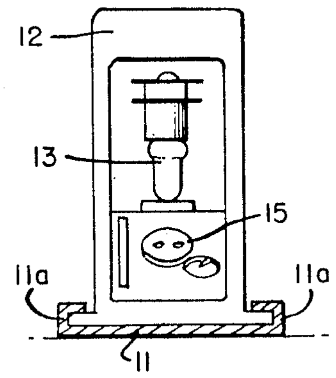
Figure 2:
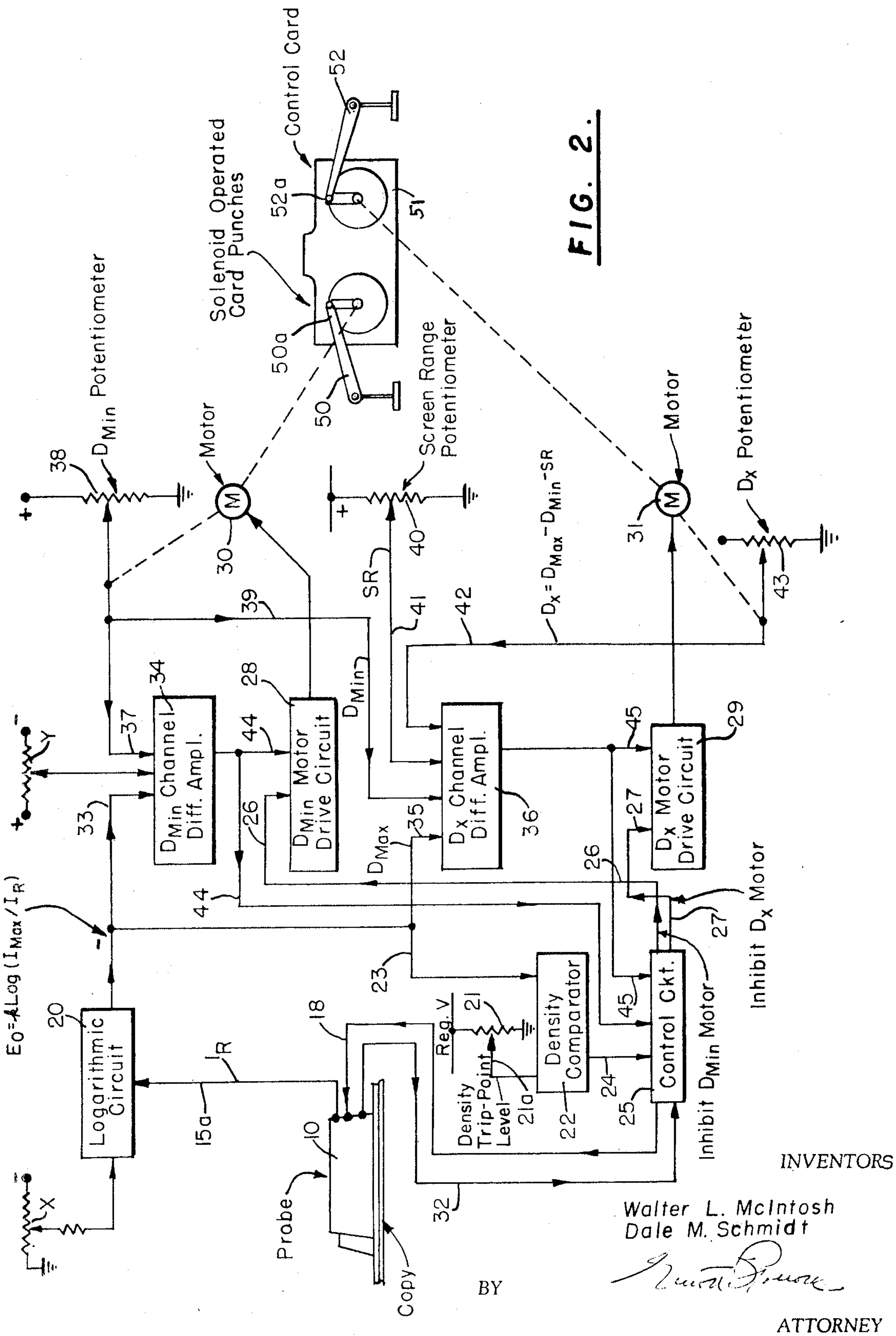
FIG. 2 is a block diagram of a copy reading unit constructed in accordance with the present invention and utilizing the probe of FIG. 1.

FIGS. 1A and 1B show one form which the densitometer head or probe may take. The probe generally designated 10, includes a base plate 11 having flanged sides 11*a* (see FIG. 1B) adapted to slidably receive a light-tight housing 12 containing a light source 13 (preferably of the lens-end type) supported in position above a light pipe 14 provided with an aperture 14*a* located at the focal point of the lamp 13. Light pipe 14 is mounted in a structural member 12*a* which also supports a photoconductive element 15 oriented at 45° relative to the axis of light pipe 14 which is, in turn, perpendicular to the plane of the copy being measured. As will appear hereinafter, the photoconductive element 15 is adapted to monitor light emanating from the light source 13 after it has been reflected from the copy being measured, to produce signals at leads 15*a*, which, in turn, provide an input to the copy reading unit (FIG. 2). Obviously, the elements 13 and 15 can, if desired, be repositioned into straight line opposed relation to one another, and mounted for disposition on opposite sides of a piece of copy, if it is desired to measure transmission (rather than reflection) densities.

The base plate 11 extends beyond the standby position of housing 12 (illustrated in FIG. 1A) and includes, in this outwardly extending portion, a copy locating aperture 16 which may be positioned, by sight, directly above any particular incremental portion of the copy to be measured. The structure includes a linkage, generally designated 12*b*, not shown in detail, extending between the housing 12 and a movable yoke (not shown) located above said housing 12, with said linkage being so constructed that the application of downward pressure on said yoke causes the housing 12 to slide, in flanges 11*a*, from the standby position shown in full line in FIG. 1A to the operate position shown in broken line. When the housing is moved to its operate position, the light source 13 is positioned centrally over the copy locating aperture 16 to project light downwardly onto a selected portion of the copy; and the light is then scattered and diffused by the copy so that copy-modulated reflected light intercepted by photoconductive element 15 provides a signal at leads 15*a* which is mathematically related to the reflectance of the selected portion of said copy.

The base plate 11 includes a calibration reflector or plaque 17 located interiorly of housing 12 in facing relation to aperture 14*a* when housing 12 is in its standby position. Light reflected by said plaque onto the photoconductive element 15 produces a reference signal output at leads 15*a* which corresponds to a copy reflectance light value substantially midway in the density measuring range of photoconductive element 15. This assures that copy-modulated reflectance measurements cause signal variations from such a reference level, thereby minimizing hysteresis effects which are encountered in other forms of densitometer where the output of the photoconductive element for any given measurement may be dependent to some extent on the light level to which the photoconductive element was exposed immediately prior to the measurement. It will be noted that calibration plaque 17 is completely enclosed and protected by housing 12 in both possible positions of said housing, and the plaque is accordingly protected from dirt, wear, finger marks, etc., thereby assuring that the calibration level is maintained indefinitely.

Lamp 13 is energized by power leads 18. The actual potential applied to the lamp may be varied, under different conditions of operation, between a "standy" (or comparatively low) level and a higher level corresponding to the "calibrate" or "operate" condition. In the circuit to be described hereinafter in reference to FIG. 2, the potential applied to leads 18 is caused to vary automatically in dependence upon whether housing 12 is in its standby position or in its operate position. Normally lamp 13 is energized at a comparatively low potential in its standby position thereby to maximize lamp life and to produce a light level, related to the reflectance of plaque 17, which produces the desired mid-range reference signal at leads 15*a*. When housing 12 is in its standby position, the potential applied to lamp 13 can be selectively increased to the value which it assumes in the operate position of the probe, thereby to permit calibration of the equipment. The housing 12 can, moreover, be provided with appropriate light filters in the optical path to permit spectral analysis of colored copy.

Referring now to FIG. 2, it will be seen that the probe 10 can be placed on a copy table and moved manually from one position to another over the surface of the copy being measured. At each selected copy point, as located by proper positioning of aperture 16, the housing 12 can be caused to slide to its operate position to produce a signal, designated as $I_R$, at leads 15*a*, which signal varies in accordance with the copy reflectance at the selected point. It will be appreciated that, while reference has been made to a manual displacement of probe 10 relative to the copy, an automatic indexing or scanning scheme could be employed to permit measurement of all incremental portions of copy in a raster fashion; but the manually displaceable approach is preferred where it is necessary to simplify and reduce the cost of the equipment employed, or to permit the operator to exercise judgment in selecting the copy points to be measured.

The signal $I_R$ appearing on lines 15a is applied as an input to a logarithmic circuit 20 which may take the form of a Patterson Transdiode circuit operating to convert the measured reflectance to a voltage value representative of copy reflection density. The signals at the output of circuit 20, by being related logarithmically to the copy reflectance or transmission density, accordingly have magnitudes which vary in substantially linear fashion with variations in copy density thereby avoiding measuring errors, to which prior systems have been prone, due to crowding of measurements at one end of the measurement range. The output voltage $E_O$ of circuit 20 corresponds to the equation:

$$E_O = K \log (I_{max}/I_R)$$

where $K$ is a constant factor of a given photoconductor transfer characteristic, and $I_{max}$ is a reference current corresponding to zero density.

The signal $E_O$ may be related to either $D_{max}$ or to $D_{min}$ depending upon whether the level of the signal is above or below a density trip point which is established in the equipment. In the particular embodiment shown in FIG. 2, this trip point is established by a potentiometer 21 having its resistive portion connected to a regulated voltage supply, and having a trip point voltage level coupled from potentiometer slider 21*a* to one input of a density comparator circuit 22. A second input is supplied to comparator circuit 22 from the output of logarithmic circuit 20, at line 23. The output of density comparator circuit 22, at line 24, is either a positive or a negative potential in dependence upon whether the absolute value of voltage $E_O$ is higher or lower than the selected density trip point voltage; and the polarity of output 24 therefore uniquely identifies the voltage $E_O$ as being related to either a $D_{max}$ or a $D_{min}$ measurement, and does this automatically. In one particular embodiment of the invention, the density trip point level is established at 0.65 density units (as compared with a typical copy density range of 2.0).

The density comparator output 24 is applied to a control circuit 25 which has two inhibit output lines 26 and 27 connected respectively to a $D_{min}$ motor drive circuit 28 and to a $D_X$ motor drive circuit 29 to simultaneously inhibit both circuits 28 and 29 (in the standby mode) thereby to prevent rotation of either the $D_{min}$ motor 30, or the $D_X$ motor 31. Whenever the probe 10 is in its standby position, a signal is applied via start line 32 to the control circuit 25 to insure that inhibit signals appear on both of lines 26 and 27.

When the probe is actuated to its operate position, the inhibit signal on line 32 is removed to permit a selected one of lines 26 and 27 to be enabled by an appropriate output on line 24, provided that a further inhibit signal is not present on lines 44 or 45 (to be described). At the same time, with the probe in its operate position, control circuit 25 supplies an increase in potential via leads 18 to raise the light level of the lamp 13 in the probe, as previously described. The signal applied at output 24 to control circuit 25, in the operate mode of the equipment, enables a selected one of the two lines 26 and 27 in dependence upon whether the density comparator 22 has detected that a $D_{min}$ or a $D_{max}$ signal is being measured at that instant in time.

The output potential $E_O$, in addition to being supplied via line 23 to one input of density comparator 22, is also applied via a line 33 to one input of a $D_{min}$ channel differential amplifier 34, and is also applied via a line 35 to one input of a $D_X$ channel differential amplifier 36. A second input is supplied to differential amplifier 34 at line 37, corresponding to the potential tapped from a $D_{min}$ potentiometer 38 forming a portion of the $D_{min}$ servo system to be discussed hereinafter. This same potential, taken from potentiometer 38, is applied via line 39 as an input to the $D_X$ channel differential amplifier 36. A third input to differential amplifier 36, comprising a potential designated SR, is taken from a screen range potentiometer 40, and is applied via a line 41 to said amplifier 36 to supply an input signal representative of the screen range of the half tone screen being employed. A fourth signal is also supplied to differential amplifier 36 via a line 42 coupled to the slider on a $D_X$ potentiometer 43 driven by the motor 31.

Referring now to the $D_{min}$ channel, when signals are applied at lines 33 and 37 to the inputs of differential amplifier 34, an output signal will be produced at line 44 which is coupled to an input of control circuit 25. The potential $E_O$ applied on line 33 to the input of amplifier 34 is normally negative, whereas the signal applied on line 37 from $D_{min}$ potentiometer 38 to the input of amplifier 34 is normally positive; and therefore the actual signal produced at output line 44 will have a polarity which depends upon whether the potential $E_O$ is higher or lower than the potential appearing on line 37. When the output signal on line 44 is of a particular polarity, indicating that the potential $E_O$ is greater than the potential already set on $D_{min}$ potentiometer 38, this polarity of output signal appearing on line 44 maintains the inhibit signal on line 26 and prevents any output from drive circuit 28 and any drive of motor 30. On the other hand, if a potential of opposite polarity should appear on line 44, indicative of the fact that the particular value $E_O$ then being measured is less than the value set on $D_{min}$ potentiometer 38, such a polarity of output signal appearing on line 44 will remove the inhibit signal from line 26 and will initiate an output from drive circuit 28 which causes rotation of motor 30 to move the potentiometer 38 slider coupled thereto. The potentiometer 38 slider will then move to a position sufficient to produce a potential on line 37 which nulls with the potential on line 33 so as to reduce the signal on line 44 to zero, thereby removing the output from drive circuit 28 and causing motor 30 to stop. Thus the servo system associated with $D_{min}$ potentiometer 38 acts as a peak reading and recording device since the actual potential set on the $D_{min}$ potentiometer will vary only when a particular reading is properly identified as a $D_{min}$ reading (as determined by the trip point level on line 21*a*) and when that particular $D_{min}$ value is, in addition, less than the $D_{min}$ value previously set on potentiometer 38.

By reason of the operation described, as probe 10 is moved to successive different positions on the copy, the system of FIG. 2 automatically determines when each copy reflectance density value being measured corresponds to a $D_{min}$ value, and records such values on potentiometer 38 only when the absolute value of a particular reading is less than one already noted and recorded.

As probe 10 produces outputs which correspond to $D_{max}$ levels of measurement (again, as automatically determined by the density trip point level), such signals coupled to line 35 are compared in amplifier 36 with $D_{min}$ signals (on line 39); with the SR potential (on line 41); and with the $D_X$ potential (on line 42). Differential amplifier 36 will produce an output at line 45 except under those conditions when the four inputs to said amplifier 36 have a sum of zero. Of these four inputs, the value $D_{max}$ is a negative potential, whereas the other three inputs are positive potentials; and the operating conditions of differential amplifier 36 can accordingly be described by the expression:

$$-D_{max} + D_X + D_{min} + SR = 0$$

which can be rewritten:

$$D_X = D_{max} - D_{min} - SR$$

The foregoing expression represents the value which is set on the $D_X$ potentiometer and corresponds to the various parameters which are normally taken into account, in the art, in deriving the value $D_X$.

In the preferred embodiment of the present invention, the logarithmic circuit 20 may be provided with a control input taken from an energized potentiometer *X*, and providing a correction factor which is manually adjustable to compensate the density parameter $D_{max}$ for effects arising out of flare light in the photographic system. When potentiometer *X* is employed, $D_{max}$ becomes $$D^*_{max} = \log[1/(R_{min} + FF)]$$

where $R_{min}$ is the minimum copy reflectance, and FF is an anticipated flare factor of the photographic system. The term $D_X$ then becomes $$D^*_X = D^*_{max} - D_{min} - SR$$

Potentiometer *X* is adjusted on the basis of a series of prior calibration exposures or operator experience, to that value which provides the desired degree of flare compensation. Alternatively, the actual flare present at the film plane of a Graphic Arts camera system can be measured by use of a photometer at the camera back immediately adjacent to, but outside of, the image area. The percent flare would be related to the highlight of the copy as imaged at the film plane.

To compensate for effects arising out of the presence of ultra-violet light (manifest, for example, as fluorescence in the copy), a further control input can be taken from a manually adjustable, energized potentiometer Y, and applied as a further input to the $D_{min}$ channel amplifier 34. When this compensation is employed, $D_{min}$ becomes $$D'_{min} = D_{min} \pm D_{uv}$$

where $D_{uv}$ represents the equivalent sensitometric effect resulting from ultra-violet light reflectance, absorptance, or fluorescence. Potentiometer Y is adjusted, again on the basis of prior calibration exposures or operator experience, to a value providing best compensation for the effects of uv light incident on the copy.

In a manner similar to that already described for motor 30, an output from differential amplifier 36 appearing on line 45 will remove the inhibit signal from drive circuit 29 and will supply a signal to said circuit 29 operative to energize motor 31 causing the potentiometer 43 to move to a position capable of producing the desired null condition at the input of amplifier 36. Moreover, in a manner similar to that already described, the actual polarity of signal appearing on line 45 will vary in dependence upon whether the value of $D_{max}$ being measured at any particular time requires adjustment of the $D_X$ potentiometer; and the $D_X$ potentiometer will be automatically readjusted only when the value of $D_{max}$ being measured is higher than any value of $D_{max}$ previously measured. This assures, again, that the servo portion of the system associated with the $D_X$ channel is of the peak reading type, and retains only the highest computed value of $D_X$.

By the arrangement described, two potentials are automatically set on potentiometers 38 and 43, corresponding respectively to the lowest value of parameter $D_{min}$ and to the highest computed value of parameter $D_X$, as probe 10 is moved over the copy. As has already been explained, these two parameters provide the information necessary to permit proper exposure control of the film in the Graphic Arts camera.

Figure 4:
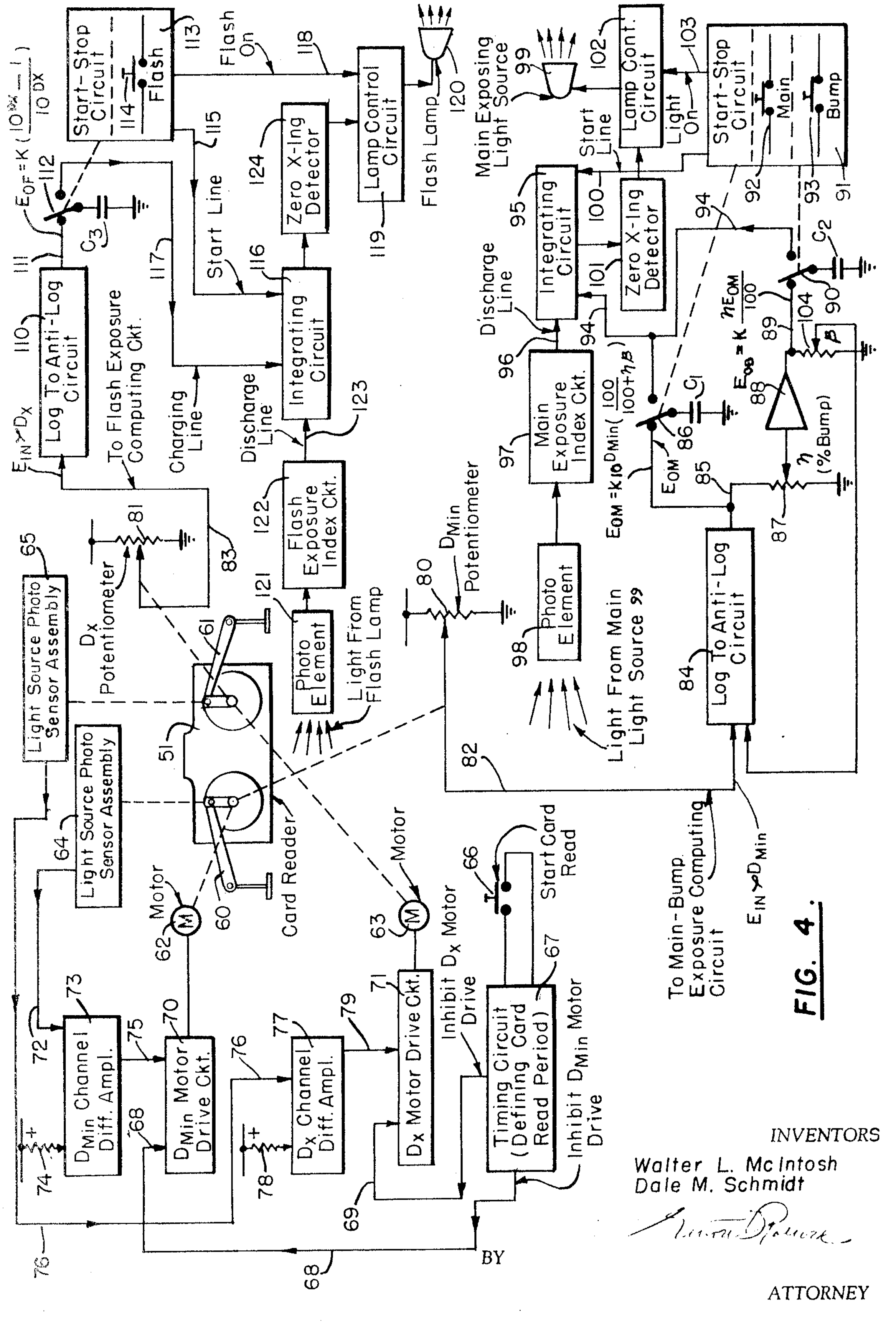
FIG. 4 is a block diagram of a camera control unit, including exposure computing and light integrating circuits, utilizing control cards produced by the unit of FIG. 2.

As will appear hereinafter, the copy reader (FIG. 2) may be directly coupled to the camera control unit (FIG. 4). However, in order to permit separation of the parameter-deriving portions of the system from the actual exposure control portions of the system, the present invention preferably records the parameters $D_{min}$ and $D_X$ on a record medium, e.g., as punchings in a control card, which can be transferred together with the copy itself to the Graphic Arts camera for later control of the camera.

Figure 3:
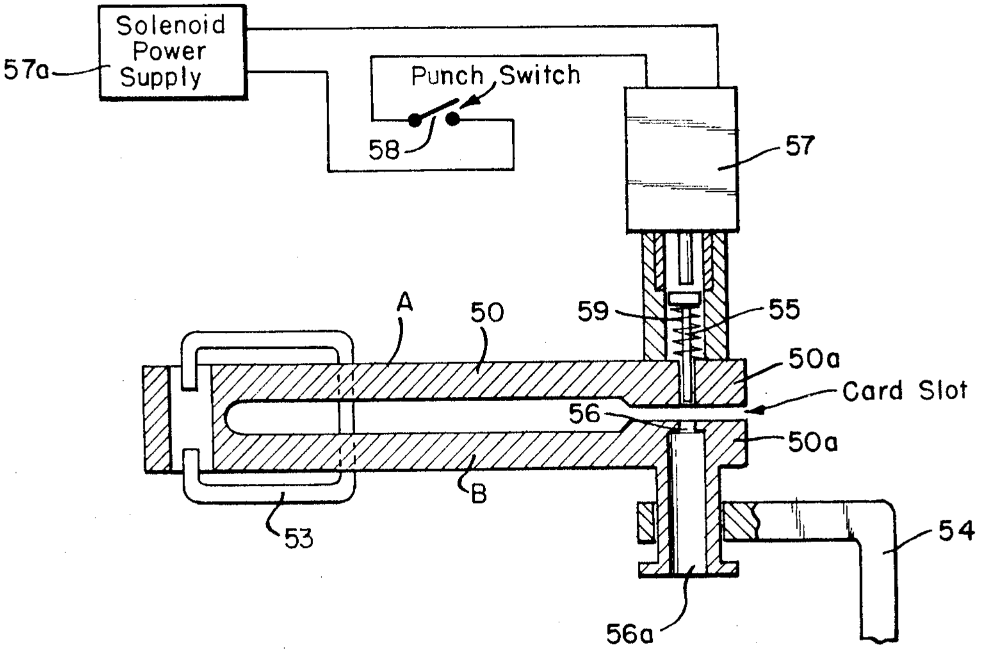
FIG. 3 is a diagrammatic view of a control card punch mechanism employed in the unit of FIG. 2.

The card punch employed in the preferred embodiment of the present invention is illustrated diagrammatically in FIG. 2, and in greater detail in FIG. 3. Referring initially to FIG. 2 it will be seen that the $D_{min}$ motor 30, in addition to controlling the position of the slider of potentiometer 38, is coupled to a card punch fork 50 which has a punch end 50*a* capable of moving to any position in a circular locus adjacent a control card 51 inserted between the tines of said fork 50. Similarly, the $D_X$ motor 31, in addition to controlling the position of the slider on potentiometer 43, moves the punch end 52*a* of a second card punch fork 52 through a further circular locus adjacent the card 51 (which is also inserted between the tines of fork 52). By this arrangement, therefore, the punch ends 50*a* and 52*a* of the two punch forks assume unique positions on their respective loci which are representative, respectively, of the final values of $D_{min}$ and $D_X$; and when these final positions have been determined, the punches associated with said forks 50 and 52 can be actuated to place a pair of punchings in the card 51 which are uniquely representative of those final parameter values. The card 51 is provided with two printed circular scales (not shown) corresponding to the aforementioned loci, and graduated linearly in density, to permit visual reading, when desired, of the recorded parameters.

The details of a portion of the card punch apparatus are shown in FIG. 3, wherein a single pair of tines (and their associated mechanisms) have been depicted, it being understood that each pair of tines are of similar construction. The typical fork 50 shown in FIG. 3 includes a pair of tines A and B between which a portion of the control card 51 can be inserted. The tines are supported on a fork support structure 53 to permit rotary movement of the punch end 50*a*; and this rotary movement is effected by a crankshaft 54 which is journaled to fork B and driven by the output shaft of a proper one of the motors 30 or 31.

A punch 55 is connected to tine A in facing relation to a punching die 56 formed in a portion of tine B. Punch 55 is selectively operated by means of an electric solenoid 57 which is coupled to the power supply 57*a* through a manually operable switch 58; and punch 55 includes a compression spring 59 which normally urges said punch to its retracted position. When the final parameter to be recorded have been determined, switch 58 can be actuated to energize solenoid 57 thereby to punch a hole in the card 51 at a particular location (on one of the aforementioned printed scales) properly associated with the determined value of the parameter. Any chad produced by the punching operation is passed through die 56 to a discharge tube 56*a*. It will be appreciated that the switch 58, although illustrated in FIG. 3 as operating only one solenoid, could be so connected that a single operation of that switch would energize solenoids associated respectively with the two card punch forks 50 and 52.

A control card prepared in the foregoing manner, and recording the information $D_{min}$ and $D_X$ (or $D_{max}$, or $D_{max} - D_{min}$, depending upon the computation circuit used in FIG. 2) can be utilized in any of a variety of subsequent control or photographic applications, e.g., at a suitably equipped Graphic Arts camera to control subsequent exposure operations. An arrangement operative to effect such camera control, utilizing cards prepared in the fashion described, is illustrated in FIG. 4.

As shown in FIG. 4, a control card prepared by the reading unit of FIG. 2 can be placed in a card reading apparatus located in the camera control unit adjacent the Graphic Arts camera to be controlled, with said card reading unit comprising a pair of forks 60 and 61 adapted to be driven respectively by a $D_{min}$ motor 62 and by a $D_X$ motor 63. Each fork includes a light source and photosensor assembly attached thereto, with these two assemblies being diagrammatically illustrated at 64 (for the fork 60) and at 65 (for the fork 61). Each of the assemblies 64 and 65 comprises a lamp mounted on one tine of its associated fork and a photosensitive element mounted on the other tine thereof so that light can pass from the lamp to the photocell only when the fork, during its rotary motion, encounters a punched hole in card 51.

If we assume for the moment that both of motors 62 and 63 are de-energized and that a punched card 51 has been inserted between the tines of forks 60 and 61, the card reading operation can be initiated by first actuating a manual start-read button 66 which is connected to a timing circuit 67 operative to define a particular card read period. It should be noted that the provision of a timing circuit having a fixed timing period is not mandatory; and, in the alternative, a form of latching circuit could be employed operative to commence the reading cycle and to permit it to continue for any period of time necessary to complete both reading operations, with the latching circuit then being reset to an inoperative state by detection of both holes in punch card 51.

Timing circuit 67 normally provides inhibit signals on its output lines 68 and 69 which are coupled respectively to a $D_{min}$ motor drive circuit 70 and to a $D_X$ motor drive circuit 71. When the timing period is initiated by actuation of button 66, the inhibit is removed from each of lines 68 and 69, thereby allowing these two circuits to initiate drive of motors 62 and 63 for the timed period defined by circuit 67. This causes the sensing ends of forks 60 and 61 to commence moving through circular loci seeking pre-punched holes in card 51. When the sensor on fork 60 encounters a hole in card 51, through the provision of the light source-photosensor assembly 64, a signal is coupled via line 72 to the input of a $D_{min}$ channel differential amplifier 73 having a second input derived from a reference current source 74. The current supplied by reference source 74 is preselected so as to balance the current which will appear on line 72 when the light source photosensor assembly 64 encounters the leading edge only of a pre-punched hole; and this accordingly causes the sensor to act as an edge-detecting device so as to render the reading operation independent of the actual size of the punched hole. Detection of a hole by the assembly 60, 64, 72–74 produces an output signal on line 75 which inhibits further drive from circuit 70, causing motor 62 to stop. In a preferred embodiment of the invention, the signal appearing on line 75, and coupled to drive circuit 70 can actually be such as to cause a momentary reversal of motor 62 and its drive coupling, so as to take up any play in gear or linkage elements associated with the fork 60.

By a similar sequence of operations, removal of the inhibit signal on line 69 causes drive circuit 71 to initiate drive of motor 63 which rotates fork 61 until light source-photosensor assembly 65 encounters the leading edge of a further hole in card 51; and this edge detection in turn produces a signal on line 76 which is coupled to the $D_X$ channel differential amplifier 77 along with an input from a reference current source 78 to produce an output signal on line 79 operative to halt (or to momentarily reverse) drive motor 63.

Motor 62, in addition to driving fork 60, positions the slider on a $D_{min}$ potentiometer 80; and similarly, motor 63, in addition to driving fork 61, positions the slider on a $D_X$ potentiometer 81. As the forks are caused to rotate and then stop at the respective holes in card 51, the sliders on the two potentiometers 80 and 81 are similarly automatically positioned and are caused to stop at positions producing $D_{min}$ and $D_X$ potentials on lines 82 and 83 corresponding respectively to the $D_{min}$ and $D_X$ potentials which had previously been derived at lines 37 and 42 in the circuit of FIG. 2.

By this arrangement, therefore, the card 51, when transferred to the camera control unit shown in FIG. 4, causes the regeneration of $D_{min}$ and $D_X$ potentials which correspond precisely to the like parameters which had previously been established at potentiometers 38 and 43 of FIG. 2. Since, in effect, potentiometers 80 and 81 (FIG. 4) thus act to produce the same control potentials earlier provided at potentiometers 38 and 43, the circuits of FIGS. 2 and 4 can be combined, if desired, simply by using common potentiometers 38–80 and 43–81. The $D_{min}$ potential appearing on line 82 is coupled to a main and bump exposure computing circuit having, at its input, a log-to-antilog circuit 84. When the FIG. 2 circuit includes uv correction, the input signal is proportional to $D'_{min}$, discussed earlier. The output of circuit 84 produces a potential $E_{OM}$ on line 85 as follows:

$$E_{OM} = K10^{D_{min}}\ [^{100/(100\ +\eta\beta')}]$$

where K is a constant, $\eta$ represents percent of bump set on potentiometer 87, $\beta$ represents a "trim" factor set on potentiometer 104 (both to be described hereinafter), and $D_{min}$ may be $D'_{min}$. Potential $E_O$ is coupled, via one contact of a relay having switch blade 86, to a storage capacitor $C_1$ and is caused to accumulate in that capacitor to provide a signal for subsequently controlling operation of the main exposure.

The signal appearing on line 85 is also coupled via a potentiometer 87 (defining $\eta$, or percentage of bump exposure) to a unity-gain non-inverting amplifier 88, and thence via a line 89 to provide a signal $$E_{OB} = K\ (\eta E_{OM}/100)$$

comprising the control signal needed to control bump exposure; and this signal $E_{OB}$ is coupled, via a contact and the switch blade 90 of a further relay, to a capacitor $C_2$ for accumulation therein.

The two relays having switch blades 86 and 90 are selectively energized by a start-stop circuit 91 provided with a start button 92 for initiating the main exposure, and a start button 93 for initiating the bump exposure. The two buttons 92 and 93 are interlocked so that only one can be actuated at a time, but they can be operated in any desired sequence. If we assume that the main control button 92 is first actuated, this energizes the relay associated with switch blade 86 to cause the charge on storage capacitor $C_1$ to be coupled via a charging line 94 to the input of an integrating circuit 95. The integrating circuit 95 is further supplied with a discharge line input 96 from a main exposure index circuit 97 which is, in turn, connected to a photosensitive element 98 which views light from the main exposing light source 99. The start-stop circuit 91 further includes a start line 100 which is energized upon actuation of the main button 92 and which provides a control signal to the integrating circuit 95, the output of which is coupled to a zero-crossing detector 101; and the output of zero-crossing detector 101 in turn supplies an input to a lamp control circuit 102 which is further supplied with a start signal on line 103 derived from the start-stop circuit 91 upon depression of button 92.

In operation, actuation of main button 92 removes a short circuit which was pre-existing across the integrating circuit 95 (doing this by virtue of the signal which appears on start line 100), dumps the charge from capacitor $C_1$ into said integrating circuit 95 and, at the same time, energizes the lamp control circuit 102 via line 103. Energization of lamp control circuit 102, in turn, causes energization of main exposing light source 99 and, by means of a connection not shown, opens the shutter on the Graphic Arts camera. In a preferred timing sequence, the lamp 99 is first energized for a period of time sufficient to permit the light level from source 99 to reach a steady state value before the camera shutter is actually opened, and the integrating circuit 95 is not permitted to operate until the camera shutter is actually opened.

Light from main source 99 is sensed by photoelement 98 which operates to produce an output signal, via main exposure index 97 and discharge line 96, to integrating circuit 95. Actually, the charge transferred from capacitor $C_1$ to integrating circuit 95 is of one polarity whereas signals appearing on line 96 are of opposite polarity; and the signals on line 96 accordingly act to discharge the integrating circuit 95 from the potential previously established by the charge transferred from capacitor $C_1$. As the discharge continues from a positive potential toward a negative potential, the output of integrating circuit 95 eventually crosses zero potential; and this point in the operation is detected by the zero crossing detector 101 which, at that point in time, produces an output signal operative to turn off the lamp control circuit 102 and thereby to turn off the main exposing light source 99 and to close the camera shutter.

The main exposure index circuit 97 comprises a constant current source associated with a pair of adjustable resistors (for "fine" and "coarse" control), with said source being energized by a potential derived from the output current of photoconductive element 98. This permits the output current appearing on line 96 of exposure index circuit 97 to be adjusted (within limits) relative to the actual current output from photoelement 98, whereby any given light seen by photoconductive element 98 can produce a selected value of discharge current on line 96. This permits the rate of discharge of integrating circuit 95 to be substantially independent of the actual current produced at the output of photoconductive element 98, and also eliminates the need for various complex light level adjusting elements which have characteristically been associated, heretofore, with the photo element used in the exposure control mechanisms of the prior art.

The signal taken from potentiometer 87 and coupled through amplifier 88, in addition to being supplied to line 89 is also supplied to a further potentiometer 104 termed the "trim" or $\beta$ control. The voltage taken from the slider of potentiometer 104 is representative of the effective density of the contact screen employed, and is coupled, as a negative feedback signal, to an input of log-antilog circuit 84 to maintain the total exposure of a selected highlight at a constant value despite changes in the percentage of bump exposure which may be effected by adjustment of potentiometer 87. This represents a major improvement over arrangements suggested heretofore since, by virtue of the circuit described, the percentage of bump exposure relative to main exposure can be readily adjusted by variation of potentiometer 87; and any such adjustment of potentiometer 87 nevertheless produces a constant total exposure of a selected highlight. The concept implemented by this circuit is discussed in "A Nomograph for the Relationship Between No-Screen Exposure and Basic Density Range", by H. B. Archer, Proc. TAGA, pp 88 et seq., 1965.

In actual practice, an operator would adjust potentiometer 87 (percentage of bump exposure) by first performing a series of trial exposures to determine the effective screen range for a variety of different settings of potentiometer 87; and would then appropriately select a particular setting compatible with the copy range and exposing technique desired. The adjustment of the $\beta$ control, potentiometer 104, is made once for any given screen employed, and is effected on the basis of a prior series of test exposures in order to produce, for any selected percentage bump exposure set on potentiometer 87, a constant value of highlight dot irrespective of the percentage of bump.

Actuation of the start button 93 operates the circuit in a fashion similar to that described above, but in connection with the bump exposure rather than the main exposure. When button 93 is activated, the charge on capacitor $C_2$ is dumped into the integrating circuit 95; start signals appear on lines 100 and 103; lamp 99 is energized; and the camera shutter is opened for a period of time determined by discharge of the integrating circuit 95 to a zero level, whereupon lamp 99 is extinguished and the camera shutter is closed. In the case of the bump exposure, it will be appreciated that the screen must be removed; and a suitable neutral density filter or equivalent attenuator is preferably placed in the optical path (preferably adjacent the lens shutter) to extend the bump exposure duration so that it is comparable to the main exposure duration. This technique is preferably employed since some of the shutters used in Graphic Arts cameras are not especially fast in operation.

The $D_X$ potential appearing on line 83 operates, in a flash control portion of the exposure computer, in a fashion similar to that described above with respect to the main and bump computer portions of the circuit. More particularly, the potential on line 83 is applied to a log-antilog circuit 110. The output signal from circuit 110 appears on line 111 and takes the form:

$$E_{OF} = K[(10^{D_X} - \mathbf{b})/(10^{D_X})],$$

where $K$ is a constant representative of a potential related to the basic flash (e.g. 10 volts). When the system includes provision for compensating the density parameters for effects arising out of flare, the term $D_X$ in the above equation is $D_X$*, as previously discussed.

The potential $E_{OF}$ is applied, through the switch blade 112 of a relay, to a capacitor $C_3$ for accumulation. The relay coil associated with switch blade 112 is located in a start-stop circuit 113 the operation of which can be initiated by a manually actuated button 114 to produce signals entirely similar to those already described with reference to start-stop circuit 91. More particularly, when button 114 is depressed, a signal is applied to a start line 115 to remove a pre-existing short circuit across an integrating circuit 116; the relay associated with switch blade 112 is energized to dump the stored charge from capacitor $C_3$ into said integrating circuit 116 via line 117; a start signal is applied via line 118 to a lamp control circuit 119 to initiate operation of flash lamp 120; and a photoconductive element 121 exposed to said flash lamp 120 produces current which is appropriately modified by a flash exposure index circuit 122 (constructed in a fashion similar to that already described with reference to circuit 97) to produce a discharge current on line 123 which is applied to the aforementioned integrating circuit 116. When the output voltage of integrating circuit 116 crosses zero potential, as detected by the zero crossing detector 124, an output signal is applied from detector 124 to the lamp control circuit 119 to extinguish the flash lamp 120.

The manually actuable button 114 is preferably interlocked with bump button 93 so that these two buttons cannot be operated at the same time. However no interlock need exist between flash button 114 and main exposure button 92; and therefore, if an appropriate flash lamp source 120 is mounted within the camera bellows, the flash and main exposures can be initiated to proceed concurrently.

The various manually adjustable potentiometers shown in FIG. 4, i.e., 87 (percentage bump), 104 (trim, or $\beta$ ), the coarse and fine adjustments in both the main exposure index circuit 97 and in the flash exposure index circuit 122, and any other potentiometer adjustments which may desirably be employed for effecting calibration of various portions of the circuit, can take the form of a bank of linear, slide-type potentiometers mounted in side by side relation to one another on a control panel of the equipment. The slider elements protrude through the panel and are preferably adapted for adjustable motion along substantially parallel paths. When an arrangement of this type is employed, the various different positions which the sliders should take for particular conditions of operation can be, in effect, pre-programmed by the preparation of an apertured program card adapted to overlay the potentiometer bank, in specific registration therewith, to define the relative positions of the potentiometer handles. A set of different program cards can be prepared in advance to program the various different potentiometer settings which may be necessitated by differing operating conditions. Alternatively, the potentiometer construction, and the mode of programming employed, can take the form presently marketed by Jordan Controls, Inc., Milwaukee, Wis., under their model series PC–3100.

While we have thus described preferred embodiments of the invention, many variations are possible. For example, means may be incorporated in the systems described to provide compensation for the effects of camera bellows extension and/or other camera conjugate settings, or for other operating variables which can influence the effective exposure of the photosensitive surface, or which come into play during subsequent reproduction steps. It must therefore be understood that the foregoing description is intended to be illustrative only and not limitative of our invention. All such variations and modifications as are in accord with the principles described are meant to fall within the scope of the appended claims.

Having thus described our invention, we claim:

1. A graphic arts copy reader comprising a probe movable to plural selected areas of a piece of copy to produce signals representing the copy densities existing at said selected areas, means defining a threshold potential representative of a mid-range density, means for comparing each of said density-representing signals with said threshold potential to segregate said signals into first input signals representative of densities less than said mid-range density and second input signals representative of densities greater than said mid-range density, a first channel responsive to a succession of said first input signals and including peak reading means for generating a first control potential related to the lowest density represented in said succession of first input signals, and a second channel responsive to a succession of said second input signals and including peak reading means for generating a second control potential related to the highest density represented in said succession of second input signals.

2. The combination of claim 1 including means for coupling said first control potential to said second channel, said second channel including means for subtracting the density represented by said first control potential from densities represented by individual ones of said second input signals, whereby said second control potential is related to the maximum difference between the densities represented by said first and second input signals respectively.

3. The combination of claim 2 including means producing a potential representative of the screen range of a halftone screen which is to be employed in a graphic arts reproduction technique, and means for coupling said screen range potential to said second channel, said second channel including means operative to subtract the density represented by said screen range potential along with the density represented by said first control potential from the densities represented by individual ones of said second input signals, whereby said second control potential is related to the amount by which the copy density range exceeds said screen range.

4. The combination of claim 3 including data recording means, and means responsive to said first and second control potentials respectively for operating said recording means to record the parameters represented by said first and second control potentials on a record medium.

5. The combination of claim 4 wherein said data recording means comprises a card punch mechanism, said record medium comprising a card adapted to be hole-punched by said mechanism.

6. The combination of claim 1 including a logarithmic circuit connected to the output of said probe and operative to produce said input signals, whereby said input signals are related longarithmically to the light reflectance or transmission of the copy and have magnitudes which vary in substantially linear fashion with variations in the density of said copy.

7. The combination of claim 1 wherein said probe comprises a densitometer head having a housing and a base plate movable between first and second positions relative to one another, said base plate including means for locating said head relative to a selected area of a piece of copy, said housing containing a light source and a photosensitive element positioned, when said housing and base plate are in said first relative position, remote from said locating means, to prevent light from said source from impinging on a piece of copy, said housing and base plate, when moved to said second relative position, being operative to move said light source and said photosensitive element toward said locating means whereby light from said source is then directed past said locating means onto a selected portion of copy and thence to said photosensitive element to produce an output signal related to the reflectance or light transmission of said selected portion of copy.

8. The combination of claim 7 wherein said base plate includes a plaque of known reflectivity positioned, when said housing and base plate are in said first relative position, to reflect light from said source onto said photosensitive element to produce a reference signal from said photosensitive element, said housing and base plate, when moved to said second relative position, being operative to move said light source and said photosensitive element away from said plaque.

9. The combination of claim 8 including means for selectively changing the light level produced by said light source when said base plate and housing are in said first relative position, to permit calibration of signals produced by said photosensitive element.

10. The combination of claim 7 including means for automatically changing the light level produced by said light source when said base plate and housing are moved from said first relative position to said second relative position.

11. The combination of claim 8 wherein said housing is light-tight and is disposed in covering and protective relation to said plaque in both of said first and second relative positions.

12. The combination of claim 1 wherein said first and second channels include first and second variable impedances respectively for producing said first and second control potentials, motor means for varying said impedances, said peak reading means comprising a null-seeking servomechanism in each of said channels for controlling drive to said motor means, each of said servomechanisms including means for comparing the value of control potential being produced at its associated impedance with the signal value of an applied input signal and operative to vary said impedance only when the compared values differ from one another in a predetermined sense.

13. The combination of claim 12 including data recording means driven by said motor means.

* * * * *